United States Patent [19]

Ennis et al.

[11] 4,392,775
[45] Jul. 12, 1983

[54] FLAT WORKPIECE PICKUP

[75] Inventors: Gerald E. Ennis, Grand Prairie, Tex.; Mario Colombo, Jr., St. Louis County, Mo.

[73] Assignee: The United States of America as represented by the Secretary of the Air Force, Washington, D.C.

[21] Appl. No.: 195,693

[22] Filed: Oct. 9, 1980

[51] Int. Cl.³ .............................................. B66F 19/00
[52] U.S. Cl. ..................................... 414/729; 294/106
[58] Field of Search ................... 99/352, 450; 180/116, 180/127; 294/7, 50.8, 106, 104; 414/589, 591, 618, 622, 685, 729, 751

[56] References Cited

U.S. PATENT DOCUMENTS

| | | | |
|---|---|---|---|
| 597,194 | 9/1896 | Newton | 294/106 |
| 1,945,311 | 1/1934 | Gustafson | 294/104 |
| 2,149,910 | 3/1939 | Clow | 294/104 |
| 3,152,706 | 10/1964 | Conrad | 294/104 |
| 3,213,779 | 10/1965 | First | 99/352 |
| 3,545,813 | 12/1970 | Matsumoto | 414/676 |
| 3,581,868 | 6/1971 | French et al. | 414/729 |
| 3,662,851 | 5/1972 | Ramsey | 180/127 |
| 3,884,363 | 5/1975 | Ajlouny | 414/751 |
| 3,929,221 | 12/1975 | Armstrong | 198/771 |
| 4,068,029 | 1/1978 | Armstrong | 198/771 |
| 4,140,226 | 2/1979 | Richter | 414/729 |

Primary Examiner—Robert J. Spar
Assistant Examiner—R. R. Diefendorf
Attorney, Agent, or Firm—Donald J. Singer; Jacob N. Erlich

[57] ABSTRACT

Apparatus for picking up a flat workpiece from a flat surface by an industrial robot where vacuum and magnetic devices are not practicable. A tined end-effector is plunged into a unique compliant surface formed of upstanding bristle-like elements with the workpiece being positioned thereon. The end-effector is moved under the workpiece which is then rigidly grasped and lifted off the surface without disturbing the original orientation and presented at the goal site.

5 Claims, 1 Drawing Figure

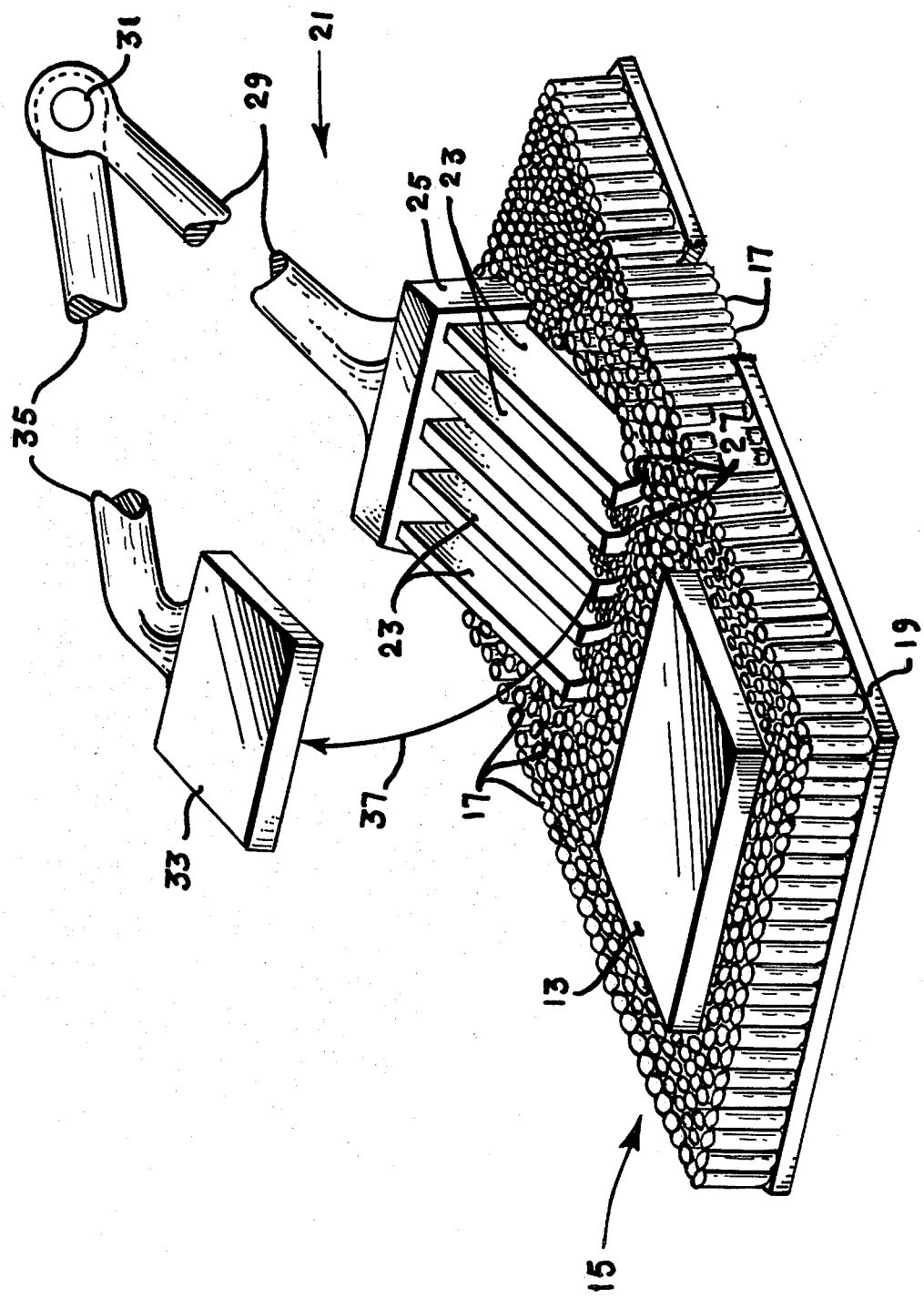

FLAT WORKPIECE PICKUP

STATEMENT OF GOVERNMENT INTEREST

The invention described herein may be manufactured and used by or for the Government for governmental purposes without the payment of any royalty thereon.

BACKGROUND OF THE INVENTION

This invention relates to a support for a flat workpiece to be picked up by a machine and, more particularly, the invention is concerned with providing a compliant surface formed of upstanding bristle-like elements which allows a tined end-effector to be plunged thereinto under a workpiece positioned thereon so that the workpiece can be picked up and transported without disturbing the original orientation.

Automation can be defined as "the act of applying mechanical devices to manipulate workpieces into and out of equipment, turn parts between operations, remove scrap, and to perform these tasks in timed sequence with the production equipment so that the line can be put wholly or partially under pushbutton control at strategic stations". The first level of mechanization is the use of the hand, known in the art as end-effector, which is, in effect, a body member that is used to perform the required action without tools. In the present instance, the required action is to pickup a flat workpiece off a flat surface while maintaining the original orientation and drop the workpiece at a selected site without the use of vacuum and/or magnetic devices.

Heretofore, it has been common practice to rely on sophisticated material handling devices including complex end-effector designs and/or other ancillary mechanisms to lift a workpiece off a flat surface for presentation to a robot. The use of any of these devices requires extensive mechanical hardware thereby contributing to the cost and complexity of the system. It would be most desirable to provide a technique for lifting a workpiece off a flat surface with a minimum of relatively simple, less costly hardware wherein the workpiece maintains its orientation when the work surface of the table is penetrated for workpiece pickup.

SUMMARY OF THE INVENTION

The present invention is concerned with providing a technique for picking up a flat workpiece from a flat surface by an industrial robot where vacuum or magnetic devices are not applicable. The workpiece is placed upon a table having a compliant surface formed of a plurality of vertical upstanding closely spaced bristle-like elements with the free upper ends providing a support surface for the workpiece. The compliant surface allows a tined end-effector or hand of the industrial robot to plunge into the brush-like surface and under the workpiece to lift and transport it to another location without disturbing the original orientation.

Accordingly, it is an object of the invention to provide a flat workpiece pickup wherein a minimum of hardware is required and no vacuum or magnetic devices are applicable.

Another object of the invention is to provide a technique for picking up a flat workpiece from a flat surface wherein the workpiece is lifted off the surface without disturbing the original orientation.

Still another object of the invention is to provide a flat workpiece pickup from a flat surface wherein the work surface is compliant and includes a plurality of vertical, closely spaced upstanding bristle-like elements.

A further object of the invention is to provide a compliant work surface for holding a flat workpiece for pickup by a robot wherein the compliant surface is arranged to bend and/or part to allow a tined end-effector to penetrate the work surface holding the workpiece.

These and other objects, features and advantages will become more apparent after considering the following detailed description taken in conjunction with the annexed drawing and appended claims.

BRIEF DESCRIPTION OF THE DRAWING

The drawing FIGURE is a view in perspective partially cut away to show details of compliant work surface with the flat workpiece positioned thereon and partial penetration of the work surface by the tined end-effector.

DESCRIPTION OF A PREFERRED EMBODIMENT

Referring now to the drawing, there is shown a flat workpiece 13 being supported on the compliant surface 15 which is composed of a plurality of bristles or bristle-like elements 17 with the upper ends thereof free to provide a level work surface for the workpiece 13. A rigid base 19 supports the bristle-like elements 17 in place and forms a rectangular table surface upon which the workpiece 13 can be positioned while still leaving room for a tined end-effector 21 to be plunged into the compliant surface 15 without disturbing the orientation of the workpiece 13.

The tined end-effector 21 includes a series of tines 23 extending forwardly from the front of a block 25. The forwardmost lower corners 27 of the tines 23 are curved to allow the end-effector 21 to penetrate the compliant surface 15 more easily. An elongated handle portion 29 (shown broken) extends rearwardly from the rear of the block 25 and includes a hinged swivel end 31 at its outermost end. A flat grasper 33 having a rearwardly extending handle portion 35 also joins the hinged swivel end 31 to complete the formation of the end-effector 21.

The size, diameter and length of the bristles 17 as well as the bristle material may be selected to meet the requirements of the particular application to support the workpiece 13 and yet allow the end-effector 21 to penetrate the compliant support surface 15 without disturbing the workpiece 13. Bristles 17 may be fabricated of rubber, nylon, polypropylene and wire, such as stainless steel depending on the size and weight of the workpiece 13. A heavier workpiece 13 would, of course, require larger diameter bristles 17 of stronger material in order to provide the proper support.

In operation, the flat workpiece 13 is placed on one side of the compliant surface 15 for pickup and removal to a target area. The tined portion 23 of the tined end-effector 21 is plunged into the compliant surface 15 beside the workpiece 13 by a machine such as a robot (not shown). The tined end-effector 21 is then moved under the flat workpiece 13 by forward and downward movement of the handle 29. The flat grasper 33 is then swiveled downward on top of the workpiece 13 along a line shown by the curved arrow 37 causing the workpiece 13 to be held by the clamping action between the tines 23 and the grasper 33. The end-effector 21 with the workpiece 13 positioned firmly therein can then be transported to the goal site by the machine or robot to which the end-effector 21 is attached. This change in location can be accomplished without disturbing the original orientation of the workpiece 13.

Although the invention has been illustrated in the accompanying drawing and described in the foregoing specification in terms of a preferred embodiment thereof, the invention is not limited to this embodiment. It will be apparent to those skilled in the art that the hereinbefore described flat workpiece pickup can be used with other differently shaped workpieces especially where it is critical to maintain the original orientation of the workpiece during pickup and transport. Also, it should be noted that certain changes, modifications and substitutions can be made in the construction details without departing from the true spirit and scope of the appended claims.

Having thus set forth the nature of our invention, what we claim and desire to secure by Letters Patent of the United States is:

1. In combination, a compliant table surface for supporting a flat workpiece thereon, said compliant table surface comprising a rigid base member and a plurality of vertical upstanding closely spaced bristle-like elements affixed at the lower ends thereof to said rigid base member, the free upper ends of said bristle-like elements forming a level work surface; and an end-effector for firmly grasping said workpiece for transportation to a different location, said end-effector comprising a lower member having a plurality of tines extending forwardly from a block, each of said tines being rectangular in cross-section over their entire length up to their forward ends, the forward ends of each of said tines being curved upwardly from the bottom surface of said tines to the top surface of said tines, a handle portion extending rearwardly from said block, and a single upper member having a flat planar grasper corresponding in size to the said plurality of tines positioned substantially parallel to said upper surface of each of said plurality of tines with a handle portion extending rearwardly therefrom, the rearward end of the handle of said lower member being pivotally attached to the rearward end of the handle of said upper member to form said end-effector whereby the tines on the lower member of said end-effector can be inserted into the compliant table surface and moved under the workpiece, the grasper on the upper member of said end-effector being pivotable downward to firmly grasp the workpiece thereby allowing the workpiece to be picked up for transportation to a different location without disturbing the original orientation of the workpiece.

2. The combination defined in claim 1 wherein said bristle-like elements forming the level work surface supporting the workpiece are fabricated of nylon.

3. The combination defined in claim 1 wherein said bristle-like elements forming the level work surface supporting the workpiece are fabricated of polypropylene.

4. The combination defined in claim 1 wherein said bristle-like elements forming the level work surface supporting the workpiece are fabricated of stainless steel.

5. The combination defined in claim 1 wherein said bristle-like elements forming the level work surface supporting the workpiece are fabricated of rubber.

* * * * *